F. LAUR.
VEHICLE FOR USE IN HIGH SPEED LOCOMOTION.
APPLICATION FILED FEB. 15, 1915.
1,288,930.
Patented Dec. 24, 1918.
3 SHEETS—SHEET 2
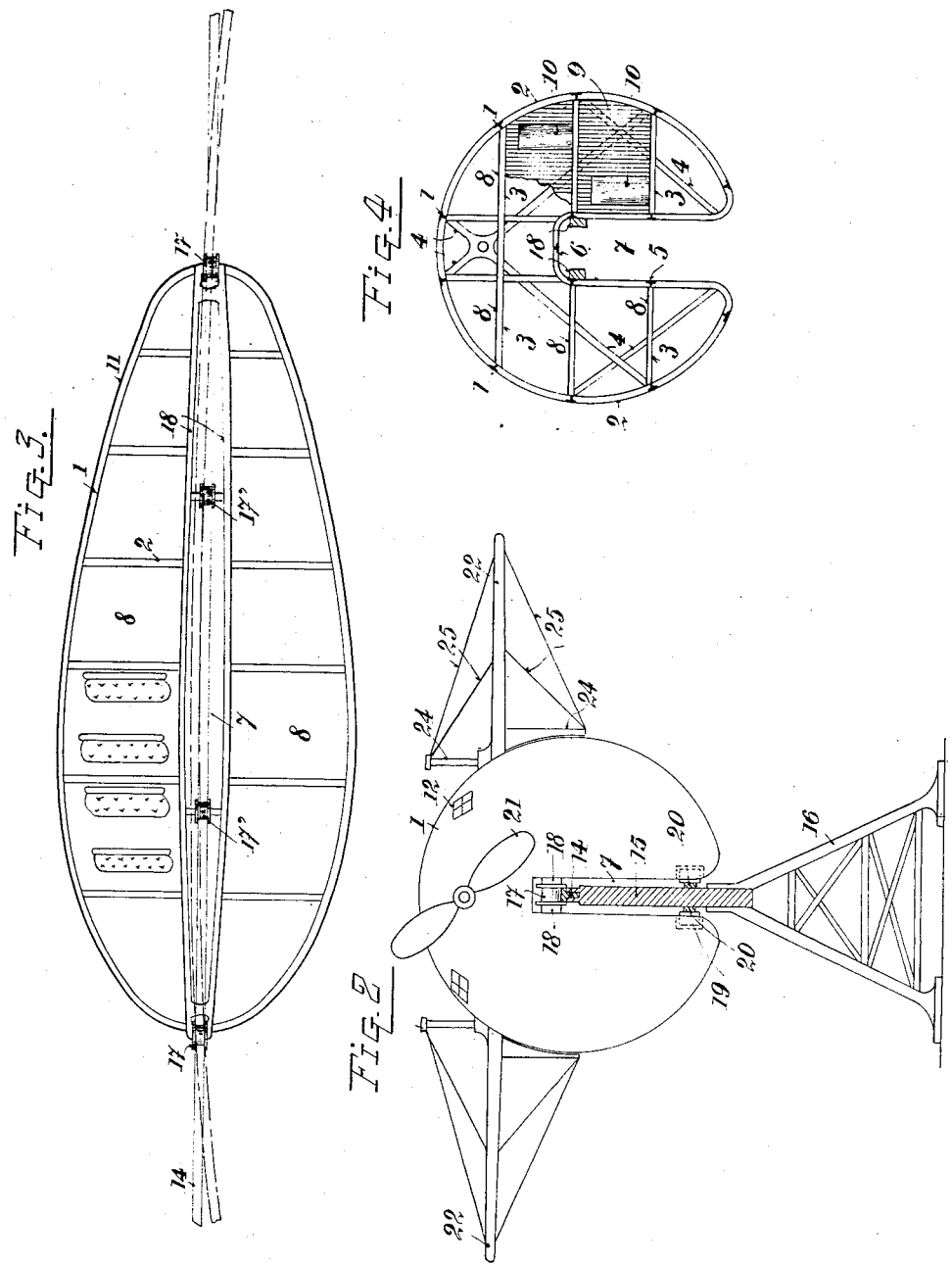

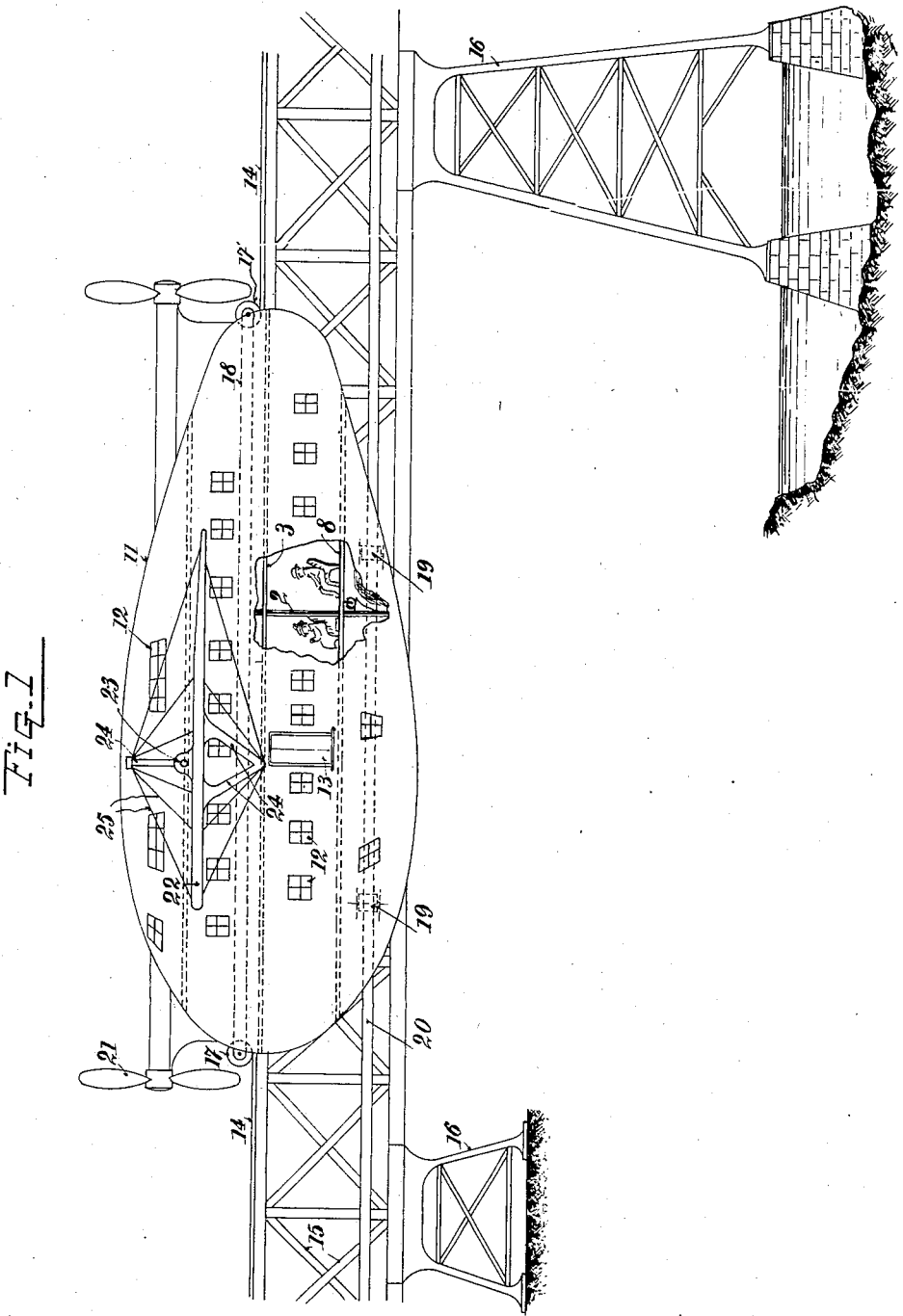

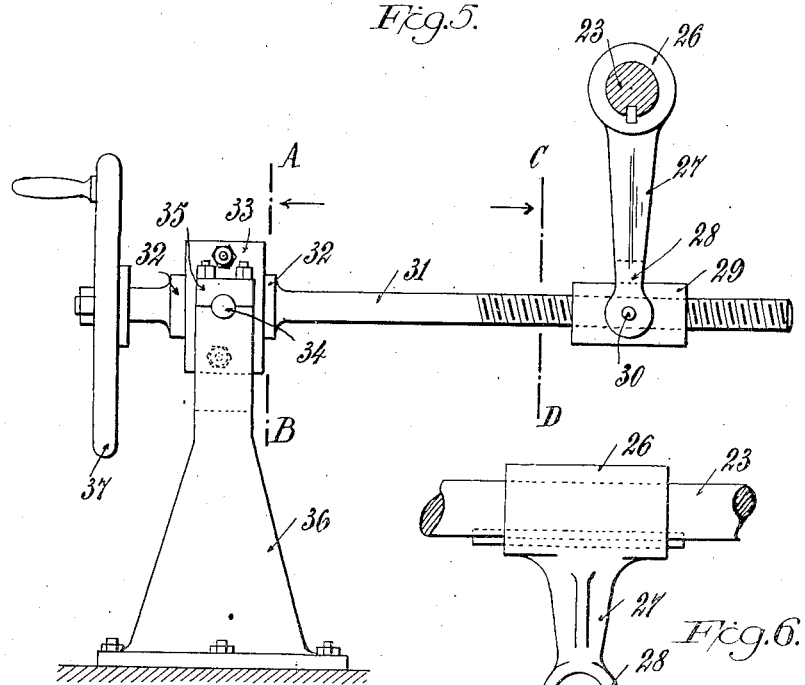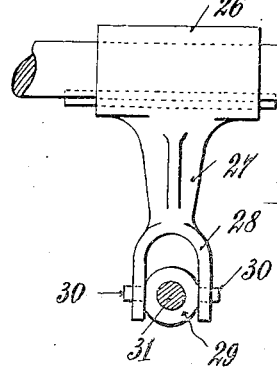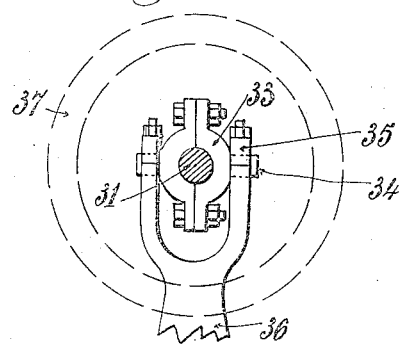

UNITED STATES PATENT OFFICE.

FRANCIS LAUR, OF PARIS, FRANCE.

VEHICLE FOR USE IN HIGH-SPEED LOCOMOTION.

1,288,930.     Specification of Letters Patent.     Patented Dec. 24, 1918.

Application filed February 15, 1915. Serial No. 8,438.

*To all whom it may concern:*

Be it known that I, FRANCIS LAUR, engineer, a citizen of the French Republic, and residing at 23 Rue Brunel, Paris, Department of the Seine, have invented certain new and useful Improvements in Vehicles for Use in High-Speed Locomotion, of which the following is a specification.

The present invention relates to improvements in vehicles for use in high speed locomotion in connection with a monorail, the main object of the invention being to maintain the vehicle in the desired direction of travel, a further object of the invention being to construct a vehicle somewhat in the form of an aeroplane having planes or wings, the provision of which, renders it possible, by modifying their incidence, to relieve the supporting rail of a larger or smaller part of the weight of the vehicle.

The vehicle may be propelled by means of one or more propellers and if these are electrically driven, the electric current may be taken by appropriate contact devices from insulated conducting rails fixed to the framework upon which the monorail is supported. These conducting rails also serve to insure the maintenance of the vehicle in the desired position by preventing any lateral displacement thereof.

Generally speaking the vehicle is ovoid in form so that it encounters the minimum of resistance from the air during its displacement.

The invention is illustrated diagrammatically and by way of example only, in the accompanying drawing, in which—

Figure 1 is a general side elevation of a vehicle, embodying the invention, mounted on a monorail supported by standards:

Fig. 2 is an end elevation.

Fig. 3 is a sectional plan, and

Fig. 4 is a front elevation of one of the stayed partitions.

Fig. 5 is an elevation of a means that may be employed to modify the incidence of the planes or wings;

Fig. 6 is a section on the line C—D of Fig. 5; and

Fig. 7 is a similar view on the line A—B of Fig. 5,

The main framework of the vehicle may be composed of rolled iron sections, profiled wooden members, or of aluminium, preferably the latter. The general form of this framework is such that when the covering has been fitted, the vehicle is substantially ovoid in form, leaving in the interior a longitudinal gangway of appropriate width and depth. The framework as shown in Figs. 3 and 4, comprises longitudinal members 1 which form the generating lines of the vehicle, an appropriate number of arches 2 arranged transversely throughout the entire length of the framework, horizontal crosspieces 3, struts 4, and, finally, longitudinal elements 5 and transverse elements 6 which define the sides and the bottom of the passage way 7.

The crosspieces 3 support flooring 8 and the arches 2 may be utilized to support partitions 9 (Fig. 4), provided with doors 10 affording communication between the several compartments.

The framework is covered externally by a covering 11 composed, for example, of aluminium plates. At suitable places in this covering, provision is made for the insertion of glazed frames 12 for lighting the compartments and one or more doors giving access to the interior.

The vehicle is divided into a number of floors and each floor is subdivided into compartments. The lower floor or story is preferably reserved for luggage and various materials. The intermediate floor is intended for passengers and the machinery, such for example, as electric or other motors, may be located on the upper floor. It will be understood that stairways may be provided for establishing communication between the various floors.

As shown in Figs. 1 and 2, the vehicle is supported by a rail 14 fixed to the upper part of a metal structure 15 supported by standards 16 resting on the ground and arranged at suitable intervals.

The vehicle is furnished with a number of flanged wheels 17 and 17' and is mounted so that the structure 15 is located in the passage way 7 as shown in Fig. 2, the wheels 17, 17' bearing upon the top of the rail 14. In order to impart greater stability to the vehicle, its longitudinal axis should preferably be located beneath the top of the rail 14. The wheels 17' are loose upon axles carried by two strong longitudinal members 18 rigidly connected with the framework of the vehicle within the passage 7.

In order to insure the maintenance of the vehicle in the vertical position, it bears by means of rollers 19 against two rails 20 arranged on either side at the base of the structure 15.

When electric motors are employed, one of the rails 20 is electrically insulated from the structure 15 and similarly the rollers 19 in contact with such insulated rail are electrically insulated from the vehicle but connected by conductors to the motors. The earth return takes place through the body of the vehicle, the structure 15 and the standards 16.

The propulsion of the vehicle is effected by the propellers 21 arranged fore and aft of the vehicle, as shown, or else laterally thereof, or they may be arranged in both positions. These propellers are driven simultaneously by one or more motors arranged in the upper story of the vehicle.

A supporting plane or surface 22 is arranged on each side of the vehicle, or a plurality of such planes may be arranged, either in different vertical planes or all in one and the same horizontal plane. These planes are supported by a shaft 23 passing through the motor room and connected with means which render it possible, by oscillating the shaft 23 about its axis, to vary the angle of incidence of the planes 22. Uprights 24, fixed to the shaft 23 and guys 25 hold the planes in a fixed position relatively to the displaceable shaft 23.

A simple form of means for oscillating the shaft 23 and wings or planes thereon is shown in Figs. 5 to 7. A sleeve 26, keyed to the shaft 23 is provided with an arm 27 having its outer end, 28, forked and engaging trunnions 30 on a nut 29. Said nut is mounted on a threaded section of the shaft 31 supported in the bearing 33 which is adapted to oscillate about its trunnions 34 which are supported on a suitable support 36. The bearing 33 is held in place on the support 36 by a cap 35 and collars 32 prevent longitudinal movement of the shaft 31 relative to said bearing. Rotation of the shaft 31 is effected by a hand wheel 37. As the shaft 31 is prevented from longitudinal movement any rotation thereof acts to move the nut 29 on the shaft and thus oscillate the arm 27 and wing or plane supporting shaft 23.

Fig. 3 shows that the passage way 7 for the rail 14 widens out toward the center from each end. The object being to render it possible to curve the rail 14 and its supporting structure so as to enable the vehicle to effect slight changes of direction. It will be understood that, in view of the high speed which the vehicle is capable of attaining, these curves should be of very large radius. When the vehicle is negotiating a curve, the flanged wheels 17' which are arranged between the end wheels 17, are free to move axially while rotating.

The arrangement above described operates in the following manner:

The rotation of the propellers in the appropriate direction displaces the vehicle upon the rail 14. As soon as the vehicle has acquired the necessary speed, the driver acts upon the wings or planes 22 in such a manner as to increase their angle of incidence gradually to an amount corresponding to the speed attained. In these conditions and proportionately to the speed with which the vehicle is traveling on the one hand and to the angle of incidence of the wings on the other hand, a greater or less proportion of the total weight of the vehicle is, by the intermediary of the wings, supported by the air.

By appropriately regulating the speed of the propellers and the incidence of the wings, the driver can establish running conditions with a very high speed during the continuance of which almost the whole of the weight of the vehicle is supported by the air and the only purpose served by the rails 14 and 20 is to guide the vehicle and conduct the electric current to the motors.

In these conditions the driver is free from preoccupation as to the guidance of the vehicle, which is guided by the rail: this is a realization of what may be termed "guided flight."

It will be understood that at the various stopping places, platforms can be provided on both sides of the vehicles and on a level with its floor or floors.

In order to provide against the possibility of the vehicle leaving the track vertically under the influence of the air pressure beneath its wings, the lower portion of the rollers 19 can be given a circular flange which, in the eventuality under consideration, would impinge against the lower flange of the rails 20 and consequently maintain the vehicle in contact with the rails.

The dimensions, proportions and internal arrangements of the vehicle are of course capable of modification, and the ovoid form illustrated in the drawing can be lengthened or shortened to a greater or less extent.

Having now particularly described and ascertained the nature of my said invention and in what manner the same is to be performed, I declare that what I claim is:—

1. A vehicle for use in high speed locomotion comprising a body of ovoid form provided with a monorail receiving passageway that opens through its bottom and ends and extends above the center of gravity of the vehicle, said passageway being of greater width in its middle portion than adjacent its ends, and means on the body for lessening the action of the force of gravity on the vehicle.

2. A vehicle for use in high speed locomotion comprising a body of ovoid form provided with a monorail receiving passageway that opens through its bottom and ends and extends above the center of gravity of the vehicle, said passageway being of greater width in its middle portion than adjacent its ends, supporting rolls or wheels arranged within said passageway adjacent the ends thereof and held against lateral movement, additional rolls or wheels within the wider portion of the passageway and adapted to move laterally thereof, and means on the body for lessening the action of the force of gravity on the vehicle.

3. A vehicle for use in high speed locomotion comprising a body of ovoid form provided with a passageway to receive a monorail above the center of gravity of the vehicle, and planes or wings mounted on the body and adapted to have the angle of incidence thereof varied at will to relieve the monorail of the weight of the vehicle while the latter is in motion.

In testimony whereof I affix my signature in presence of two witnesses.

FRANCIS LAUR.

Witnesses:
  PAUL FANCHER,
  DE WITT C. POOL, Jr.